United States Patent [19]

Childress, Jr. et al.

[11] 3,832,734

[45] Aug. 27, 1974

[54] CASSETTE LOADING AND UNLOADING APPARATUS

[75] Inventors: Lloyd K. Childress, Jr.; George B. Flippen, Jr.; Louis M. McDaniels, all of Austin, Tex.

[73] Assignee: International Business Machines Corporation, Armonk, N.Y.

[22] Filed: July 3, 1972

[21] Appl. No.: 268,239

[52] U.S. Cl. .................... 360/96, 242/198, 360/105

[51] Int. Cl.... G11b 5/00, G11b 15/32, G11b 23/04

[58] Field of Search ............ 274/4 C, 4 F; 242/198, 242/199; 179/100.2 Z

[56] References Cited

UNITED STATES PATENTS

| | | | |
|---|---|---|---|
| 3,612,432 | 10/1971 | Johnson | 242/198 |
| 3,623,678 | 11/1971 | Housman et al. | 242/198 |
| 3,635,423 | 1/1972 | Lennie | 242/198 |
| 3,675,876 | 7/1972 | Frederick | 242/198 |

*Primary Examiner*—Leonard D. Christian
*Attorney, Agent, or Firm*—James H. Barksdale, Jr.

[57] ABSTRACT

A loading, unloading and recording apparatus for a magnetic tape cassette. The apparatus is made up of a cassette hopper which is pivotable for properly positioning a cassette in communicating relationship with a retractable read/write head and pinch roller mechanism. Pivotable on the same axis is a loading door which is spring biased away from the hopper. Partial closing of the door will result in the proper positioning of the cassette, while complete closing and latching of the door will actuate the retractable mechanism for inserting a read/write head and pinch roller into the cassette. When the cassette is to be unloaded, the door is unlatched and the spring causes the door to open. During the first extent of travel of the door in opening the read/write head and pinch roller are withdrawn from the cassette while the cassette is maintained in position. Thereafter, the door continues pivoting to its completely open position and the hopper pivots to an unloading position for removal of the cassette.

10 Claims, 4 Drawing Figures

CASSETTE LOADING AND UNLOADING APPARATUS

CROSS-REFERENCE TO RELATED APPLICATIONS

U.S. Patent Application Ser. No. 293,252, filed Sept. 28, 1972, entitled "Recording Tape Drive Apparatus," having G. B. Flippen, Jr. as inventor.

BACKGROUND OF THE INVENTION

1. Field of the Invention

This invention relates to cassette handling apparatuses in general, and more specifically to a tape cassette loading, unloading, and recording apparatus.

2. Description of the Prior Art

Previously proposed apparatuses for handling cassettes have required a number of operator manipulations which are cumbersome in many instances. For example, having to position the cassette with one hand and hold it in place, while closing a door or causing insertion of the read/write head with the other, is inconvenient. One of the most serious problems associated with previous devices has involved the proper positioning of the cassette prior to causing the head to be inserted into the cassette for recording purposes. If the cassette is not properly positioned, the read/write head, the tape guide devices, and/or the tape can be damaged. Also, time can be lost due to the operator having to reload the apparatus. Many of the same type of problems are also present when unloading is to be accomplished.

SUMMARY OF THE INVENTION

The aforementioned problems are overcome through the use of the loading, unloading, and recording apparatus according to this invention. In the preferred embodiment the apparatus is made up of a door and hopper, both hinged about the same axis. Both the door and hopper are spring connected and separated in a normally open position. When a loading operation is to begin, a cassette is placed in the hopper and the door is closed. During the first extent of travel of the door during the closing operation, the spring connecting the hopper and the door causes the cassette to be properly positioned relative to a read/write head and pinch roller mechanism. Further travel of the door to the closed position will result in the read/write head and pinch roller mechanism being activated with the read/write head and pinch roller being inserted into the cassette for recording purposes. When the door is completely closed, it is automatically latched and held. Thereafter, when the cassette is to be unloaded, the door is unlatched and springs open. During the first extent of travel of the door in opening, the cassette is maintained in its position and the read/write head and pinch roller are withdrawn from the cassette. During further travel of the door to the completely open position, the hopper is pivoted away from the recording position for unloading.

With the apparatus of this invention, only one motion of the operator is involved after the cassette has been placed in the hopper. The door is closed, the read/write head and pinch roller are automatically inserted into the cassette, and the door is automatically latched.

DESCRIPTION OF THE PREFERRED EMBODIMENTS

Figures 1, 2:
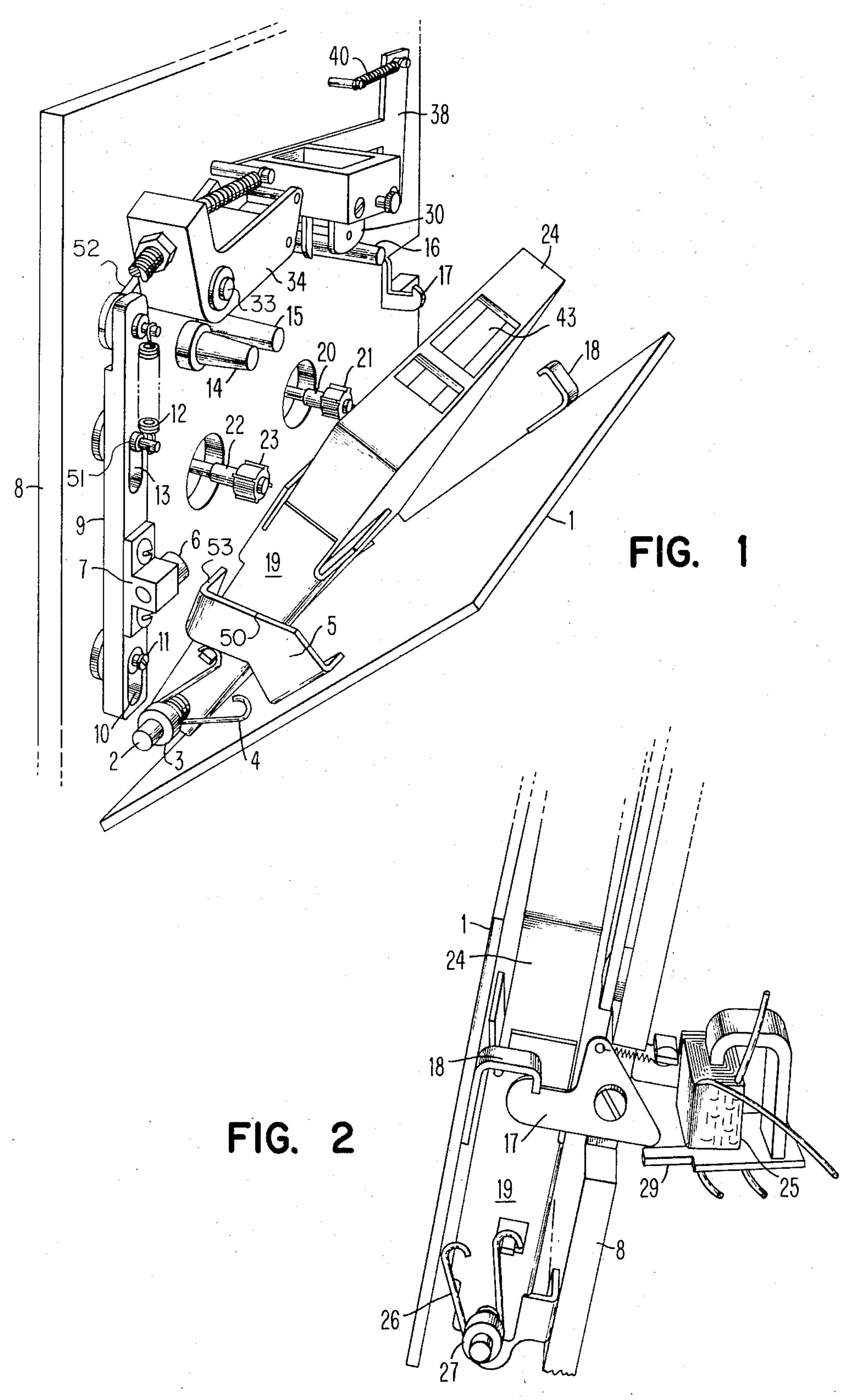
FIG. 1 is a perspective view of the apparatus according to this invention showing the door, hopper, retractable read/write head and pinch roller mechanism, and the latching mechanism for the door.
FIG. 2 is a perspective view showing the door closed, the cassette in the read/write position, and the latching mechanism for the door.

For a more detailed description of the invention, reference is first made to FIG. 1 wherein there is shown in perspective the apparatus of this invention. Door 1 has latching arm 18 and caming arm 5, and is pivotable about shaft 2. Also pivotable about shaft 2 is hopper 19 which is separated from door 1 by spring 4 (and spring 26 shown in FIG. 2). Spring 4, which is freely maintained on shaft 2 by hub 3, effects separation of hopper 19 and door 1, and biases door 1 and hopper 19 in the position shown.

When a cassette 24 is placed in hopper 19 and a read/write operation is to be performed, an operator will push door 1 forward (to the left) for closing. As door 1 moves to the left a first extent and is partially closed, the action of spring 4 will cause hopper 19 to properly position cassette 24 under read/write head 30. That is, hopper 19 will be brought into flush contact with frame 8 and cassette 24 will be properly positioned in communicating relationship with head 30. In this position, star drives 21 and 23 connected to drive shafts 20 and 22, respectively, will seat in cooperating openings in the take up and supply reels incorporated into cassette 24. The function of drives 21 and 23 is to tension the tape 43 when driven in the forward and reverse directions by capstan 15 when pinch roller 44 is in contact therewith. Also, alignment pins 14 and 16 will seat in cooperating openings in cassette 24 to insure proper lateral positioning of cassette 24. The tensioning provided by star drives 21 and 23 and the driving by capstan 15 is fully described in the above cross-referenced application. Drive capstan 15 will be positioned in another coooperating opening in cassette 24.

When door 1 is moved further to the left for complete closing, a read/write head and pinch roller mechanism will be activated, bringing read/write head 30 into contact with tape 43. This is effected by caming arm 5 acting against cam pin 6, raising cam shuttle 7 and connected slide bar 9 against the action of spring 12. Slide bar 9 is maintained by guides 11 and 51 positioned in elongated slots 10 and 13, respectively. When slide bar 9 is raised, crank 34 is pivoted about pivot post 33 by link 52 which also pivots about post 33.

Figure 3:
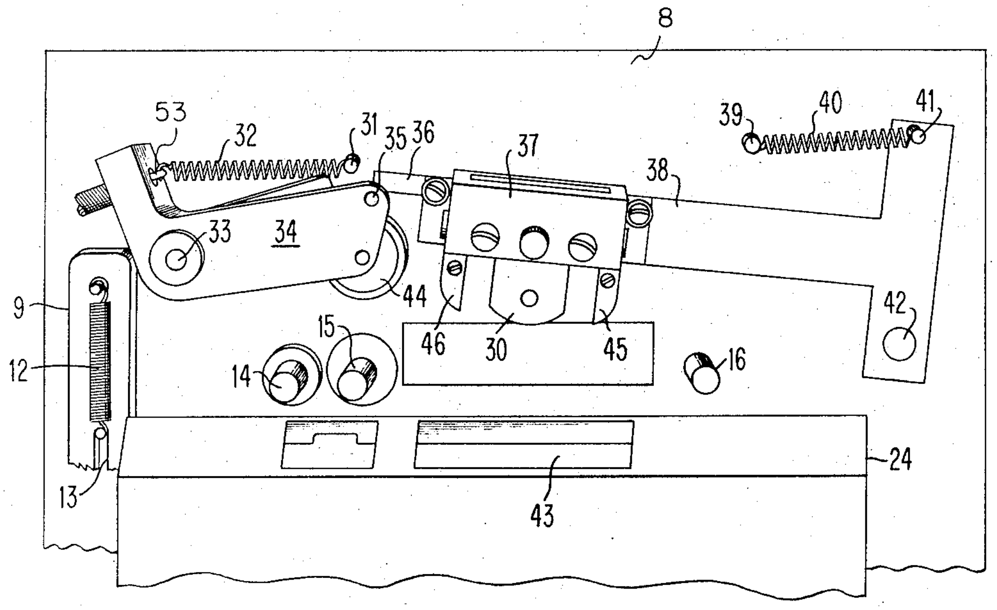
FIG. 3 is a perspective view illustrating the retractable read/write head and pinch roller mechanism in the normal position when the door is open.
Figure 4:
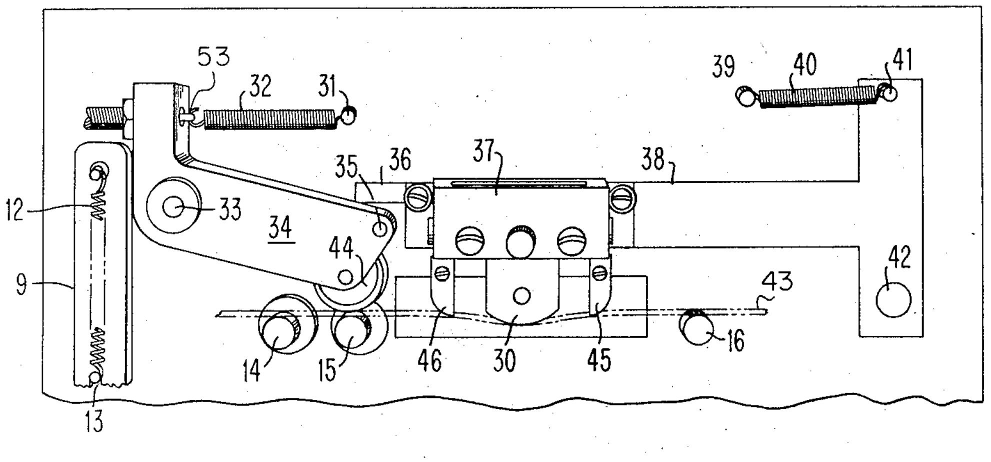
FIG. 4 is another perspective view illustrating the retractable read/write head and pinch roller mechanism in contact with a cassette tape when the door is closed.

Referring next to both FIGS. 1 and 3, cam surface 50 on caming arm 5 will contact cam pin 6 after hopper 19 and included cassette 24 are positioned flush against frame 8. Further closing of the door, resulting in clockwise rotation of crank 34, will bring pinch roller 44 into contact with tape 43 (FIG. 4). Any mechanical play is compensated for by spring 32 connected to hook 53 and pin 31. That is, spring 32 insures a positive contact between capstan 15, tape 43, and pinch roller 44.

As shown most clearly in FIGS. 3 and 4, read/write head 30 is carried by head frame 37 which also has tape guide rails 45 and 46 for guiding tape 43. Head frame 37 is mounted on crank 38 which pivots about pivot post 42. Crank 38 is urged in a counterclockwise direction by spring 40 connected to pins 39 and 41. In the normally open position shown in FIGS. 1 and 3, frame 37 and crank 38 are maintained by arm 36 which rests against pin 35.

When door 1 is completely closed as shown in FIG. 2, spring biased and rotatable latch 17 will automatically catch and hold latching arm 18. Also shown in this figure are spring 26 and hub 27 which are the counterparts of hub 3 and spring 4 shown in FIG. 1.

Referring again to FIG. 4, with door 1 completely closed, crank 38 has been rotated in a counter clockwise direction and head 30 has been brought into contact with tape 43. In this position, contact is positively maintained by spring 40 since pin 35 and arm 36 are not in contact. Pinch roller 44 and head 30 are therefore independent of one another. Contact in this instance is not desirable since any deformation in pinch roller 44 could result in head 30 being lifted from tape 43. Positive contact between 1) pinch roller 44, tape 43, and capstan 15, and 2) head 30 and tape 43 is required for driving tape 43 at a constant velocity and insuring the reading and recording of all data on tape 43.

Referring again to FIG. 2, when door 1 is to be opened, electromagnet 25 is activated, causing armature 29 to rotate latch 17 in a counter-clockwise direction for releasing latching arm 18.

During the opening of door 1, the first extent of travel will not affect the position of hopper 19 and cassette 24. That is, springs 4 and 26 will initially urge door 1 away from hopper 19, and hopper 19 will remain flush against frame 8. As door 1 separates from hopper 19, cam pin 6 will ride down cam surface 50. During this time, pinch roller 44 and read/write head 30 will be withdrawn from cassette 24 and will assume the position shown in FIG. 3. When springs 4 and 26 have opened to the extent defined by lug 53 and hopper 19, momentum and gravity will cause door 1 and hopper 19 to assume the position shown in FIG. 1. Thereafter, cassette 24 can be unloaded and another cassette loaded into the apparatus.

In summary, the apparatus is made up of a door and associated hopper, both hinged about the same axis. Both the door and hopper are spring separated in a normally open position. When a loading operation is to begin, a cassette is placed in the hopper and the door is closed. During the first extent of travel of the door during the closing operation, the spring connecting the hopper and the door causes the cassette to be properly positioned under a retractable read/write head and pinch roller mechanism. Further travel of the door to the completely closed position will result in the read/write head and pinch roller being lowered by a camming means on the door, with the read/write head being inserted into the cassette for recording purposes. When the door is completely closed, it is automatically latched and held. Thereafter, when the cassette is to be unloaded, the door is unlatched and springs open. During the first extent of travel of the door in opening, the cassette is maintained in its position and the read/write head and pinch roller are withdrawn from the cassette. During further travel of the door to the completely open position, the hopper is pivoted away from the recording position for unloading.

With the apparatus of this invention, only one motion of the operator is involved after the cassette has been placed in the hopper. The door is closed, the read/write head and pinch roller are automatically inserted into the cassette, and the door is automatically latched.

While the invention has been particularly shown and described with reference to a particular embodiment, it will be understood by those skilled in the art that various changes in form and detail may be made without departing from the spirit and scope of the invention.

What is claimed is:

1. A tape cassette loading and unloading apparatus comprising:
   a. first hinged means for accepting a tape cassette;
   b. second hinged means, associated with said first means, for causing during a first extent of travel proper positioning of said cassette in communicating relationship with a read/write head;
   c. biasing means for biasing said second means away from said first means; and
   d. third means operable by said second means for causing, during further travel of said second means, said read/write head to contact a tape in said cassette after said cassette has been properly positioned.

2. An apparatus according to claim 1 further including means for locking said second means while said read/write head is in contact with said tape.

3. An apparatus according to claim 1 wherein said third means includes a pinch roller for causing contact between said tape and a capstan for driving said tape.

4. An apparatus according to claim 2 further including means for unlocking said second means.

5. An apparatus according to claim 3 wherein said pinch roller and said head are independent of one another when in contact with said tape.

6. A tape cassette loading, unloading and recording apparatus comprising:
   a. first hinged means for holding a tape cassette;
   b. second hinged means for positioning said first means for a recording operation when moved a first extent;
   c. biasing means for biasing said second means away from said first means;
   d. third means operable by said second means when said second means is moved to a closed position for causing a read/write head to contact a tape in said cassette; and
   e. fourth means for locking said second means in said closed position.

7. An apparatus according to claim 6 wherein said first means is a cassette hopper pivotable about a shaft.

8. An apparatus according to claim 7 wherein said second means is a door pivotable about said shaft and spring connected to said hopper.

9. An apparatus according to claim 6 wherein said third means is a retractable read/write head and pinch roller mechanism.

10. An apparatus according to claim 9 wherein said retractable mechanism comprises a read/write head and pinch roller which are independent of one another during a recording operation.

* * * * *